United States Patent
Rider

[15] 3,692,832
[45] Sept. 19, 1972

[54] METHOD FOR THE PRODUCTION OF SUBSTITUTED CYANAMIDES
[72] Inventor: Harold D. Rider, 26 South Cherman, Denver, Colo. 80209
[22] Filed: Aug. 4, 1967
[21] Appl. No.: 663,186

[52] U.S. Cl. ............................................. 260/551 C
[51] Int. Cl. ............................................. C07c 125/08
[58] Field of Search .................. 260/551 C, 583, 551

[56] References Cited

UNITED STATES PATENTS

| 3,371,118 | 2/1968 | Lundeen et al. | 260/583 |
| 3,227,761 | 1/1966 | Brunner et al. | 260/583 |
| 2,858,338 | 10/1958 | Speziale | 260/551 |

FOREIGN PATENTS OR APPLICATIONS

| 404,174 | 10/1924 | Germany | 260/551 |

OTHER PUBLICATIONS

Parker, Advances in Organic Chemistry: Methods and Results, Vol. 5, pp. 2– 3, 22– 25 (1965) (Interscience Publ.) (N.Y.)

Primary Examiner—Henry R. Jiles
Assistant Examiner—Harry D. Moatz
Attorney—Joseph C. Herring and Richard C. Willson, Jr.

[57] ABSTRACT

The present invention comprises a process for the production of mono- and disubstituted cyanamides comprising contacting cyanamide with an organic mono-halide in a dipolar aprotic solvent at a temperature of about 0° to 200° C.

9 Claims, No Drawings

METHOD FOR THE PRODUCTION OF SUBSTITUTED CYANAMIDES

BACKGROUND OF THE INVENTION

The mono- and di-substituted cyanamides produced by the methods of the present invention have, because of their high chemical reactivity and their versatility in entering into a variety of reactions, found use both as chemical intermediates for other single compounds and as starting materials for polymers. They are also useful for fabric softening and water repellant fabric treating agents, as additives for solid propellants (see U.S. Pat. No. 3,190,915), and in alkyd resins (see U.S. Pat. No. 2,895,929). For example, these compounds may be reduced to form the corresponding amines, either primary or secondary. Various processes for the production of these mono- and di-substituted cyanamides have been proposed in the past. For example, U.S. Pat. No. 2,349,851 to Dreyfus (which is concerned principally with the formation of compounds which contain two cyanamide groups from the reaction of a cyanogen halide with a corresponding diamine) mentions in passing that cyanamide itself may also be employed with a dihalogenated hydrocarbon in the presence of caustic soda or caustic potash. None of the examples of that patent are concerned with the use of cyanamide itself (and attempts to practice the route mentioned have not been successful). (See 26 J. Org. Chem. 4122-23 (1961)). However, the present invention may utilize dihalides and produce polymeric cyanamides. No mention is made of the method by which the cyanamide is to be handled in the Dreyfus patent. Cyanamide itself is unstable under ordinary conditions and it is an important advantage of the present invention that the cyanamide may be supplied in a commercially available readily handled aqueous solution.

SUMMARY OF THE INVENTION

The present invention, by the use of the conjoint presence of moderate bases, e.g., alkali metal carbonates and bi-carbonates, permits the production of mono- and di-substituted cyanamides from the commercially available aqueous solutions of cyanamide (if desired), and provides high yields of the desired products. Further, by the use of appropriate ratios of cyanamide to organic halide, together with the appropriate selection of either alkali metal bi-carbonate or carbonate, the product can be either substantially pure mono-substituted cyanamides or substantially pure di-substituted cyanamides. For mono-substituted cyanamides from about 0.75 to about 1.5, more preferably from about 0.85 to about 1.25, and most preferably about 1 mole of organic halide will be present for each mole of cyanamide present in the reaction mixture. The moderate base chosen will then preferably be a base having a $pK_b$ of about 12 to 7, e.g., potassium cyanate, potassium nitrite, potassium sulfate. Conversely, for the production of di-substituted cyanamides, from about 1.25 to about 3.0, more preferably from about 1.5 to about 2.5, and most preferably about 2 moles of organic halide will be used for each mole of cyanamide present in the reaction mixture, and the moderate base utilized will preferably be a base having a $pK_b$ of about 4 to 7, e.g., a carbonate.

DESCRIPTION OF THE PREFERRED EMBODIMENTS

The organic halides for use with the present invention can be alkyl, e.g., methyl halide, ethyl halide, isopropyl halide, butyl halide; aralkyl, e.g., benzyl halide, chloroethyl benzene, chloroisopropyl naphthalene; alkenyl halides, e.g., 1-chloroethylene, 1-chlorobutene-2, 2-chlorobutene-2; and allyl halides, e.g., allyl halide, methallyl halide, aralkenyl halides, 1-chloro-4-phenyl butene-2. In general, the preferred halogens (in order of decreasing preference) will be chlorine, bromine, and iodine. The ability of the present invention to utilize alliphatic chloride starting materials is, so far as I know, not provided by any previously known method for the production of substituted cyanamides from cyanamide.

The starting materials for the present invention will preferably contain from about one to 20, more preferably from about one to five, and most preferably from about one to 10 carbon atoms per molecule.

The cyanamide for use with the present invention may be the commercially available grades and for reasons of economy and ease of handling, the commercially available 50 percent aqueous solution of cyanamide manufactured, for example, by The American Cyanamide Company of Wayne, New Jersey is preferable. The ratio of organic halide to cyanamide will be varied within the ranges mentioned previously in order to favor the production of di- or mono-substituted cyanamides whichever is the desired product. For laboratory use, cyanamide itself, for example, that sold by Eastman Organic Chemicals, Rochester, N.Y., or American Cyanamide Company, may be utilized, but this starting material is not preferred because of its expense and difficulty of handling.

By dipolar aprotic solvent is meant herein compositions which are liquid under the conditions of the reaction, which have a high dielectric constant, (greater than about 15° at 25° C), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to anions in solution in the reaction mixture. The aprotic solvent can be composed of a mixture of liquids so long as the overall liquid compositions meet the above criteria. Preferred among the aprotic solvents are N-alkyl pyrrolidones, dialkyl formamides, (e.g., N,N-dimethylformamide), N,N-dimethylacetamide, acetonitrile, N-alkyl-pyrrolidone, hexaalkylphosphoramide, and tetraalkylurea, especially those in which the alkyl groups are methyl groups. The most preferred solvent for the reaction of the present invention is dimethylformamide. Preferably from about 10 to about 100, and most preferably from about 15 to about 35 moles of the solvent will be present for each mole of halide starting material.

Strong bases should, in general, be avoided in the practice of the present invention because of their deleterious effect on most of the dipolar aprotic solvents employed. The preferred bases are moderate bases, that is those having $pK_b$ of from 10 to about 1, preferably from 9 to 4, and more preferably from 8 to 5. Especially preferred are alkali metal and alkaline earth metal carbonates and bicarbonates, e.g., potassium carbonate, potassium bicarbonate, sodium carbonate, sodium bicarbonate, calcium carbonate, calcium bicarbonate, etc. Organic bases, e.g., triethylamine, pyridine and other organic compounds within the above mentioned $pK_b$ ranges may be utilized but are not in general preferred. The moderate base should be chosen to have sufficient solubility in the reaction mixture to permit the reaction to proceed. At least about 1 mole of base should be present for each mole of organic chloride in the reaction mixture. The preferred ranges of base are from 0.8 to about 2.0, more preferably from 0.9 to about 1.5, and most preferably from 1.0 to about 1.25 moles of base per mole of organic chloride in the reaction mixture.

While not narrowly critical, the reactions of the present invention may be run at temperatures of from about 0° to 200°, more preferably 20° to 150°, and most preferably from about 50° to about 150° C.

The process of the present invention may be practiced on a batch or on a continuous basis in conventional equipment e.g., stirred closed lid reactors with suitable provision for agitation. In general it will be preferable to conduct the reactions at temperatures below the boiling point of the solvent or the most volatile component of the reaction mixture and this may be accomplished either by maintaining a somewhat lower temperature or by increasing the pressure on the reactor, e.g., by use of a pressurized nitrogen atmosphere. Pressure is not especially important to the reactions of the present invention and may range from 0.1 to over 10,000 psia, with pressures of from about 0.5 to about 150 psia being preferred, and pressures of from about 13 to about 20 psia being most preferred.

The invention will be better understood by reference to the Examples which follow. These Examples are to be taken as being illustrative of the invention, and all of the wide variety of modifications and variations which will be obvious to persons skilled in the art by reading of the present specification should be considered as being within the spirit of the claims appended hereto.

No attempt has been made to optimize conditions for any of these examples.

EXAMPLE I 4.5 Ml of $H_2NCN$ (53.5 mmoles, 50 percent aqueous solution), 4.15 g of $K_2CO_3$ (30 mmoles) and 70 ml of DMF are placed in a flask equipped with a mechanical stirrer, a thermometer with temperature controller attached, condenser and a means of dropping benzyl chloride into the reaction mixture. This mixture is brought to 100° C and 6.3 g (50 mmoles) benzyl chloride in 5 ml of DMF is added over a period of 30 minutes. The reaction is then allowed to run at 100° for 19 hours. The reaction mixture is cooled and filtered to yield 3.8 g of solid which was identified as inorganic, potassium chloride, potassium carbonate, and potassium bicarbonate. The filtrate is quenched in large amounts of water and the mixture extracted twice with diethyl ether. The diethyl ether is then washed once with water and dried over sodium sulfate. The ether is evaporated to yield 4.5 g of a liquid which soon solidifies and is recrystallized twice from diethyl ether petroleum ether mixture to yield white platelets, melting point 52°–53°. This is an 81 mole percent yield of dibenzylcyanamide based on benzyl chloride.

EXAMPLE II 4.5 Ml (0.0525 moles) 50 percent aqueous solution of cyanamide, 2.5 g (0.025 moles) sodium bicarbonate, and 75 ml dimethylformamide, are placed in the apparatus which is described in Example I. The temperature is raised to 100° C and 6.3 g (0.050 moles) of benzyl chloride in 5 ml dimethylformamide is added dropwise over a period of 15 minutes. The reaction is run for six hours at 100° C. The inorganics are filtered off and the filtrate is quenched in 500 ml of water and extracted with three portions of diethyl ether (100 ml). The ether solution is washed with water and dried over magnesium sulfate. Evaporation of the diethyl ether yields a light yellow liquid which is triturated with petroleum ether to remove any unreacted benzyl chloride; the yield is 4.1 g of crude product.

This product is allowed to stand several days and crystals form which prove to be tribenzyl isomelamine m.p. 130°–131° C. This is known to be formed by the trimerization of

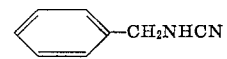

This is a 60 mole percent yield of benzyl cyanamide, the desired product.

EXAMPLE III 3.40 Ml 50 percent aqueous solution of $H_2NCN$, 3.6 g of $K_2CO_3$, and 75 ml DMF is placed in the reaction flask described in Example I, and brought to 100° C. 4.63 g n-butylchloride in 10 ml DMF is added dropwise over a period of 30 minutes. The reaction is allowed to run for 16 hours at 100° C. The reaction is worked up as in Example I to yield 1.4 g of a light yellow liquid which is essentially all distilled at 57° C at 10 mm of Hg. The yield of N,N-Dibutyl cyanamide is 36 percent.

EXAMPLE IV 7.6 g methallyl chloride, 4.25 ml 50 percent aqueous solution of $H_2NCN$, and 13.8 g $K_2CO_3$ are placed in the reaction set-up and run at 70° C for 16 hours. After cooling, the reaction mixture is filtered to remove inorganic salts and the filtrate distilled. Two fractions boiling at 72° C at 1 mm Hg had a total weight of 3.5 g. This is a 52.4 percent yield of dimethallyl cyanamide, as confirmed by IR, NMR, mass spectroscopy, and elemental analysis.

What is claimed is:

1. A process for the production of monosubstituted cyanamide comprising contacting cyanamide with an organic mono-halide having one to 20 carbon atoms selected from alkyl halides, aralkyl halides, alkenyl halides, and wherein the halogen is chlorine, bromine, or iodine in a dipolar aprotic solvent which is liquid under the conditions of the reaction, has a dielectric constant greater than about 15° at 25° C., is dipolar so that one part of the molecule has a more positive electrical charge relative to the other parts of the molecule causing the molecule to act as a dipole, is sufficiently inert not to enter into deleterious side reactions to a significant degree under the reaction conditions, which does not possess hydrogen atoms capable of hydrogen bonding with or transferring to anions in solution in the reaction mixture or mixtures of such liquids, at a temperature of about 0° to 200° C. in the presence of a moderate base having a $pK_b$ of from about 10 to about 1, wherein the cyanamide is contacted with from about 0.75 to about 1.5 moles of organic mono-halide per mole of cyanamide, wherein the moderate base is an alkali metal bicarbonate and wherein the product recovered consists of a major amount of monosubstituted cyanamide.

2. The process of claim 1 wherein the dipolar aprotic solvent is selected from the group consisting of N-alkyl pyrrolidone, dialkyl formamide, N,N-dimethylacetamide, acetonitrile, N-alkylpyrrolidone, hexaalkylphosphoramide, and tetraalkylurea.

3. The process of claim 1 wherein the moderate base is an alkali metal carbonate.

4. The process of claim 1 wherein the organic mono-halide is selected from the group consisting of: alkyl halide, alkyl aromatic halide, aralkyl halide, alkenyl halide, and aralkenyl halide.

5. The process of claim 5 wherein the organic monohalide is a monochloride containing from one to 20 carbon atoms.

6. The process of claim 5 wherein the organic monohalide is a mono-bromide containing from one to 20 carbon atoms.

7. The process of claim 5 wherein the organic monohalide is a mono-iodide containing from one to 20 carbon atoms.

8. A process according to claim 1 for the production of the monosubstituted organic cyanamide consisting essentially of contacting an alkali metal carbonate or bicarbonate and benzyl chloride or N-butyl chloride or methallyl chloride with an aqueous solution of cyanamide in the presence of dimethylformamide.

9. The process of claim 1 wherein the organic monohalide is nonallylic.

* * * * *